(12) United States Patent
Berkema et al.

(10) Patent No.: US 7,190,476 B2
(45) Date of Patent: Mar. 13, 2007

(54) PRINT BY REFERENCE SERVICE COMMUNICATION PROTOCOL AND INTERFACE

(75) Inventors: Alan C. Berkema, Granite Bay, CA (US); Jeff Morgan, Cupertino, CA (US); Pat Stoltz, San Diego, CA (US); Todd Fischer, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 851 days.

(21) Appl. No.: 09/897,693

(22) Filed: Jun. 29, 2001

(65) Prior Publication Data

US 2003/0035133 A1 Feb. 20, 2003

(51) Int. Cl.
*G06F 3/12* (2006.01)
*G06K 15/00* (2006.01)

(52) U.S. Cl. ..................... 358/1.15; 358/1.14
(58) Field of Classification Search ........ 358/1.1–1.18; 709/228, 229, 230, 231, 232, 319; 710/31, 710/33
See application file for complete search history.

(56) References Cited

U.S. PATENT DOCUMENTS

| | | | |
|---|---|---|---|
| 5,539,665 A | | 7/1996 | Lamming |
| 5,768,483 A | * | 6/1998 | Maniwa et al. ............. 358/1.15 |
| 5,848,413 A | * | 12/1998 | Wolff .......................... 707/10 |
| 5,862,321 A | | 1/1999 | Lamming |
| 5,915,214 A | | 6/1999 | Reece |
| 5,974,416 A | | 10/1999 | Anand et al. |
| 6,173,407 B1 | | 1/2001 | Yoon |
| 6,184,996 B1 | | 2/2001 | Gase |
| 6,189,788 B1 | | 2/2001 | Sherman |
| 6,324,521 B1 | * | 11/2001 | Shiota et al. ................. 705/27 |
| 6,347,340 B1 | | 2/2002 | Coelho |
| 6,379,058 B1 | | 4/2002 | Petteruti |
| 6,400,272 B1 | | 6/2002 | Holtzman |
| 6,407,820 B1 | * | 6/2002 | Hansen et al. ............. 358/1.12 |
| 6,448,906 B1 | | 9/2002 | Nachtsheim |
| 6,452,689 B1 | | 9/2002 | Srinivasan |

(Continued)

FOREIGN PATENT DOCUMENTS

EP 0886206 12/1998

(Continued)

OTHER PUBLICATIONS

Z. Pie, L. Weidong, W. Jing, W. Youzhen, "Bluetooth—The Fastest Developing Wireless Technology", IEEE, vol. 2, Aug. 21, 2000, pp. 1657-1664.

*Primary Examiner*—Douglas Q. Tran (57) ABSTRACT

A print service, preferably realized as a web site or part of web site, supports print by reference operations. Software hosted or accessible by the web site performs the required functions. The print service, using a protocol, accepts a reference to print content, resolves the reference, obtains the print content, transcodes the print content into a print device ready format, and allows the print client access to the transcoded print data. The print service method realized by such a web site provides commercial potential for web services and content provider partnerships, as a preferred use of the print service might commence with a user of a portable wireless device obtaining a reference to print content while web surfing, communicating that content, for example via a Bluetooth wireless connection to the print device, which then uses the print service to resolve and process the print by reference communication.

19 Claims, 4 Drawing Sheets

U.S. PATENT DOCUMENTS

| | | |
|---|---|---|
| 6,501,832 B1 | 12/2002 | Saylor |
| 6,601,102 B2 * | 7/2003 | Eldridge et al. ............ 709/229 |
| 6,738,841 B1 * | 5/2004 | Wolff .......................... 710/62 |
| 6,744,528 B2 | 6/2004 | Picoult |
| 6,757,749 B2 * | 6/2004 | Aoki et al. .................... 710/5 |
| 6,772,338 B1 | 8/2004 | Hull |
| 6,778,289 B1 * | 8/2004 | Iwata ....................... 358/1.15 |
| 6,782,542 B1 * | 8/2004 | Mein et al. ................. 719/330 |
| 6,842,460 B1 | 1/2005 | Olkkonen |
| 6,857,023 B2 * | 2/2005 | Rivadalla et al. ........... 709/230 |
| 6,975,419 B2 * | 12/2005 | Staas et al. ................ 358/1.15 |
| 2001/0016921 A1 | 8/2001 | Takahashi |
| 2001/0037462 A1 * | 11/2001 | Bengtson ................... 713/201 |
| 2001/0048533 A1 | 12/2001 | Koana |
| 2002/0002592 A1 | 1/2002 | Aoki |
| 2002/0016921 A1 * | 2/2002 | Olsen et al. ................ 713/200 |
| 2002/0083114 A1 * | 6/2002 | Mazzagatte et al. ........ 709/100 |
| 2002/0186408 A1 * | 12/2002 | Nakaoka et al. ........... 358/1.15 |
| 2002/0188646 A1 | 12/2002 | Terrill |
| 2005/0131819 A1 * | 6/2005 | Aoki et al. |

FOREIGN PATENT DOCUMENTS

| | | |
|---|---|---|
| EP | 0893760 | 1/1999 |
| EP | 893760 A2 * | 1/1999 |
| EP | 0936 808 | 8/1999 |
| EP | 0 974 890 | 1/2000 |
| GB | 2 342 197 | 4/2000 |
| GB | 2 356 321 | 5/2001 |
| WO | WO 01/33365 | 5/2001 |
| WO | WO 01/42894 | 6/2001 |

* cited by examiner

PRINT BY REFERENCE SERVICE COMMUNICATION PROTOCOL AND INTERFACE

FIELD OF THE INVENTION

A field of the invention is print servers. Other fields of the invention include print data services, wireless portable devices, and web based services. The invention provides support of print by reference operations in which print content is addressed by a reference, such as might be supplied by a wireless portable device or a print device.

BACKGROUND OF THE INVENTION

The traditional model for print operations is the pushing of content to a print device from a device. Most often, this involves a computer communicating with a print device, e.g., a printer or multi-function peripheral including a print function. The communication may follow the format of wired connection interface, such as the case where a print device connects to a print device over a serial or parallel computer port. The communication might also follow a wireless connection such as that used for communication through an infrared port. The basic operation in either case involves a device, e.g., a computer, linking to a computer, converting content into a format acceptable to the print device, and then transferring the data to the print device. As an example, a computer printing a Microsoft Word document addresses a print device, converts the document data and format information into a print device ready format, and pushes the data to the print device. Protocol standards handle the communication between the print device and the device pushing the data to be printed. Print servers, typically software resident or cooperative with a data generating program, convert data into a native print device format.

The traditional model limits print operations in a number of ways. One important limitation is the inability of the print device to be used by devices lacking the ability to convert data into a print device ready format. Even if this inability were overcome by some manner, another limitation concerns the practical limits of the types of devices and device connections that may utilize a print device. Specifically, devices that lack sufficient memory resources to store data to be printed are, as practical matter, unable to make effective use of a print device. In addition, devices that lack a sufficiently fast or sufficiently reliable communication link to the print device also may not effectively use the print device. A particular class of devices that might lack sufficient memory for print content, or a fast enough device-print device interface, or a reliable enough device-print device interface, are portable wireless devices. Personal digital assistants (PDAs), cell phones, wireless data terminals and other wireless devices would have increased usefulness, and add increased usefulness to print devices, if the wireless devices had efficient print capabilities.

SUMMARY OF THE INVENTION

Print by reference expands printing and the usefulness of wireless devices and print devices by permitting a reference to data content that is to be printed to be passed from a device to initiate a print job. The invention concerns a service to support the print by reference operation. The service method accepts a reference to content, transcodes the content, and establishes the transcoded content to be taken for printing.

In a preferred embodiment, a print service of the invention executes a method that accepts, from a print client, a reference to print content targeted for printing from a location indicated by the reference. The reference is resolved to determine the location indicated by the reference. Print data is obtained from that location and transcoded into a print device ready format. The print client is allowed to access print ready formatted data, which may be transferred to the print client in response to a request from the print client.

In a preferred embodiment print service of the invention, preferably realized as a web site or part of web site, software hosted or accessible by the web site performs the required functions. A print client may be a print device, for example, that has an Internet connection. A print client might also be a portable wireless device, for example, which then might transfer data transcoded by the print service to a print device. The print service method provides commercial potential for web services and content provider partnerships, as a preferred use of the print service might commence with a user of a portable wireless device obtaining a reference to print content while web surfing, communicating that content, for example via a Bluetooth wireless connection to the print device, which then uses the print service to resolve and process the print by reference communication. Similar commercial potential is possible with respect to print device manufacturers and the manufacturers of portable wireless devices, such as personal digital assistant (PDA) devices.

The protocol and operational structure of the interface to the remote print service also forms an aspect of the invention. In general, the interface formed by the protocol carried out by a remote print service of the invention should provide for access by many clients. The interface must carry out a basic level of reference resolution and should provide enhanced print by reference features for clients capable of taking full advantage of the print service through use of a protocol of the invention.

DETAILED DESCRIPTION OF THE PREFERRED EMBODIMENTS

A print service method is provided by the invention for supporting print by reference operations being conducted by a print device. In a preferred form, the print service method is provided through a web site that is used by a print device handling a print by reference operation. The print service might also be part of print device software, as another example. Print device software performing the method of the invention might therefore be part of the software executed in printers or multi-function peripherals, as well as peripheral print devices such as HP JETDIRECT® devices, including internal JETDIRECT® cards or external JETDIRECT® plug in print server devices. A device including software for executing the print service method of the invention generally requires direct or indirect access to print content to be referenced by print by reference operations.

The most important type of content and the content likely to be referenced in the print by reference operations is accessed via the Internet, and the preferred direct or indirect connection is therefore a direct or indirect Internet connection. Similarly, a particular important print service of the invention is accessed via the Internet and provides a protocol and interface to serve print clients.

In the case of the remote print service accessed via the Internet, the transcoded data transfer to the print device is preferably conducted with the print service setting up a Universal Resource Locator address for the transcoded data and then communicating the Universal Resource Locator address for the print data to the device. A protocol of the invention for the remote print service provides access for clients in various levels of sophistication dependent upon client capabilities. At a minimum, the print service permits connection for a client to pass a basic reference to print content. A protocol forming the interface to the print service also preferably supports a higher level of service, allowing a client to enrich operations and the printing of reference content by parameters made available to be set in the protocol.

Figure 1:
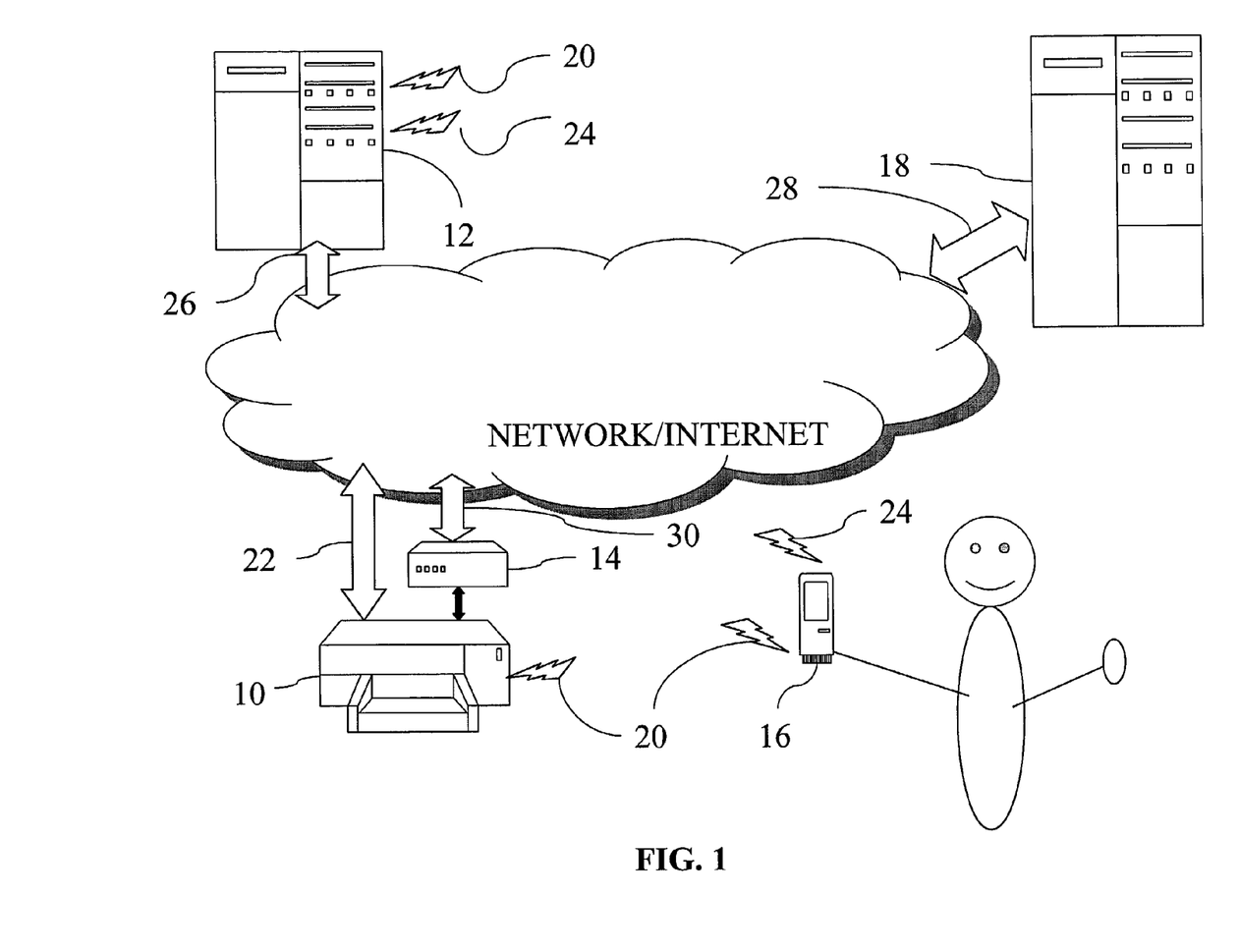
FIG. 1 illustrates a preferred example environment for implementation of the present print by reference service method.

FIG. 1 shows a preferred environment for implementing the print service method and protocol of the invention. A print device 10 accesses a print service of the invention, either via the Internet to a web site print service 12, or through another connection to a local print service 14 that may comprise software in the print device 10 when the print device 10 is carrying out a print-by-reference operation. While the local print service 14 is shown as an external device to the print device 10, it may also be internal to the print device. For example, it may be native software or an add on software. It might also be installed as a firmware card.

The print device uses the print service 12 or 14 to resolve and access the content to be printed. With the print device 10 being accessible to a portable wireless device 16, the print service 12 or 14 can therefore aid a print by reference operation initiated by the portable wireless device 16. From the perspective of the print service 12 or 14, either of the print device 10 or portable wireless device 16 may be viewed as a print client for a print by reference operation irrespective of whether the "print client" is directly or eventually making use of the print service 12 or 14. A likely scenario involves the portable wireless device 16 accessing a content provider 18, typically a web site over the Internet. The web site might include a link to print content, such as a "print-this" link. If selected, the print by reference target is transmitted to the portable wireless device 16, which then can commence a print by reference operation with the print device 10. In the preferred environment of FIG. 1, the portable wireless device uses Bluetooth wireless 20 to communicate a print by reference target to the print device 10 or, perhaps, directly to the print service 12 or 14. The print device 10 then accesses the print service 12 via an Internet interface 22. However, the print services 12 or 14 may be accessed in other manners including, for example, cellular network communications or RF transmissions.

Bluetooth is a preferred wireless RF standard developed by a technology industry consortium made up of 3Com, Ericsson, IBM, Intel, Agere, Microsoft, Motorola, Nokia, and Toshiba with a mission of creating a standard wireless protocol. More information, including protocol specifications, can be obtained on the Bluetooth website: www.bluetooth.com, with the content available from this and linked websites incorporated herein by reference. The current Bluetooth protocol has an operable range of about 10 meters, but may sometimes prove to have greater range. As an example software/device for the underlying Bluetooth communication usable by the print services 12 and 14, the print device 10 or the portable wireless device 16, a Bluetooth PC card was unveiled by 3Com on May 29, 2001. The card follows the new Bluetooth 1.1 specification and uses 3Com's connection manager software.

Other example communication protocols suitable for practice within the scope of the invention that have available commercial support are those specified by IEEE 802.11 standard. 100 meters is the optimal 802.11 maximum range, but 802.11 can work at around 300 meters. However the data rate goes from 11 Mega bits per second to about 1 or 2 Mega bits per second as range increases. Bluetooth power class III is designed for 10 meters at low power. Bluetooth Power class I uses 100 milliwatts and can go about 100 meters. Artisans will also appreciate that wireless protocols other than 802.11 and Bluetooth, e.g., infrared, might also be used and that certain preferred features, e.g., an OBEX connect are therefore unique to the preferred Bluetooth embodiment since the Bluetooth protocol requires a CONNECT while OBEX does not.

For example, the wireless device 16 typically has Internet access. This Internet access may be through a cellular network interface 24. The print service 12, preferably a web site, would have an Internet interface 26. The print service 12 may therefore be realized as a web site by software resident in a web host. The content provider 18 is also typically a web site, and therefore would have an Internet interface 28, as well. The local print service 14 requires an Internet interface 30 to access a content provider that is a web site. The interface 30 may be the same interface used by the print device 10.

A number of paths for passing a print reference and channeling print data and print services are therefore possible. Alternate preferred embodiments include the use of the local print service 14 with either the print service 14 or the portable wireless device 16 accessing the content provider 18. Either of the print services may be accessed by the print device 10 or the portable wireless device 16.

Figure 2:
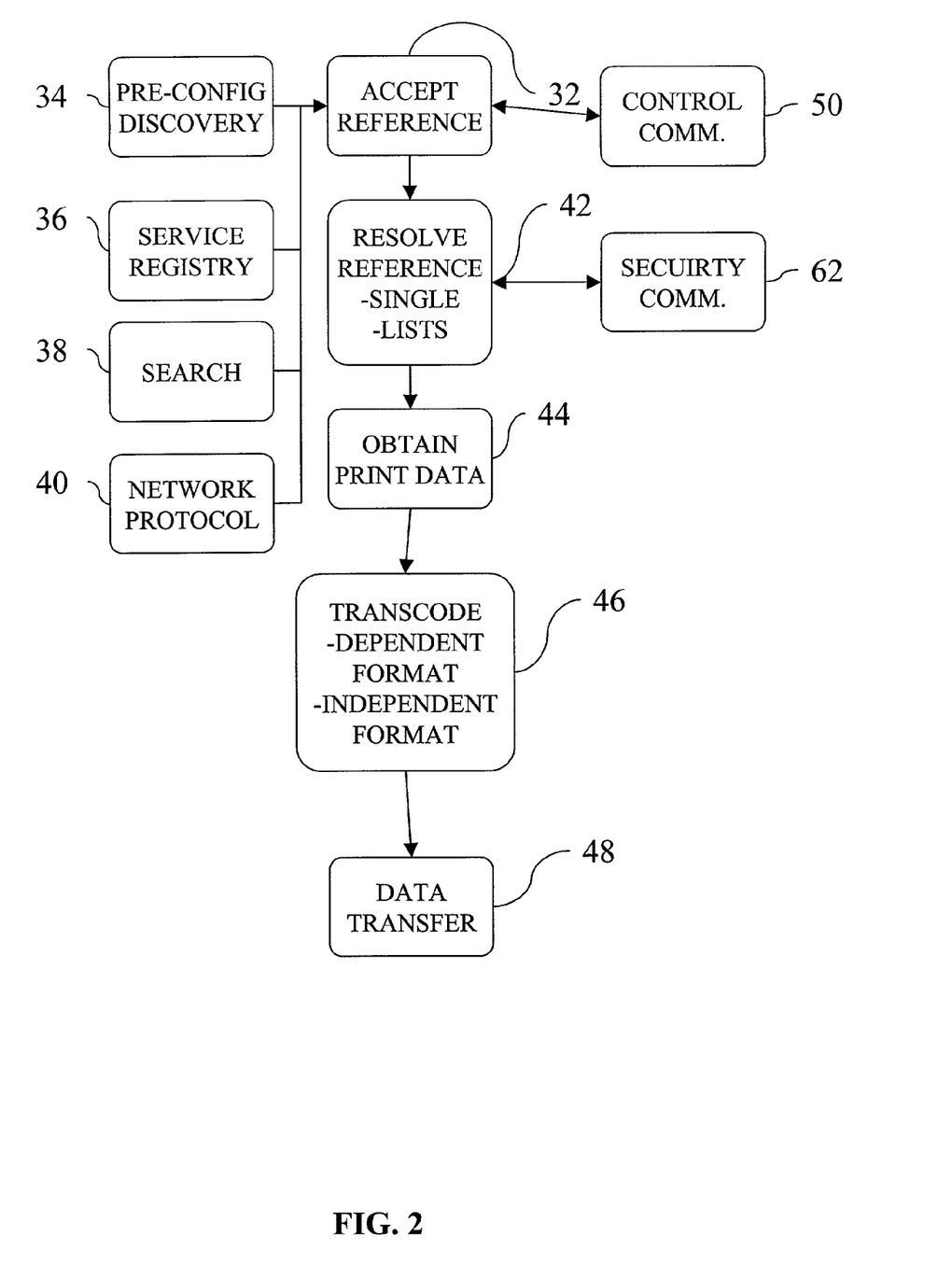
FIG. 2 is a flowchart of sequence of steps of a preferred method of the present invention.

Referring now to FIGS. 1 and 2, either one of the print services 12 or 14 accepts a reference 32 to print content targeted for printing from a location indicated by the reference. The print service 14 accepts the reference, for example, directly from the print device 10. The print service 12, on the other hand, accepts the reference via Internet interface 26. The print service 12, however, may also receive the reference 32 from a wireless connection to the portable wireless device 16. This connection might be via Bluetooth 20 or the cellular network interface 24.

A print service needs to be discovered or located by a print device or portable wireless device before it can be used, which thus may be a preliminary step to accepting a reference. Discovery may occur in a number of different ways. Some preferred possibilities are the following models for print service discovery. The location of a print service may be pre-configured 34 into a print device 10 or portable wireless device. Another alternative is for a print service to be registered 36 into a service registry. Print devices and portable wireless devices can use the registry to locate a print service based on some set of search constraints. Alternate search based discovery 38 is also possible, e.g., any form of search engine. A print service can also be located 40 via network discovery protocols.

The print service 12 or 14 resolves a reference 42 to determine the location indicated by the reference, typically a content provider 18 accessible by a Universal Resource locator. In that typical case, the reference will be a Universal Resource Locator that addresses print content targeted for printing. The accepted reference may be an individual reference, or multiple references. Accepting an reference thus may be accepting a reference list of individual references that individually reference print content stored at a location, e.g., a list of multiple Universal Resource Locators to resolve 22. Preferably, each reference in a list is processed separately followed by complete sequential processing of remaining references in a list.

The print service 12 or 14, after resolving a reference 22, then obtains the print data 44 from the location indicated by the reference. The print service 12 or 14 transcodes the print data 46 into a print device ready format, then allows access to the transcoded print data 30. Transcoding is translating obtained data into a form that can be used for printing. Preferably, the transcoding changes data into form independent of the print device type (brand) used. Preferred example formats include HTML, ASCII, and PDF. Alternatively, the transcoding can translate the data into print formats dependent upon the type of print device. Dependent formats may be the proprietary formats used by different print device manufacturers. Recognition of an appropriate format is a concern with the remote print service 12, but the print service 14 embedded within or peripheral to a particular print device 10 can likely have transcoding tailored to the particular print device. The transcoded print data is transferred 48 to the print device 10 in response to a request from the print device 10. In the case of the remote print service 12 accessed via the Internet, the transcoded data transfer to the print device 10 is preferably conducted with the print service setting up a Universal Resource Locator address for the transcoded data and then communicating the Universal Resource Locator address for the print data to the device.

Figure 3:
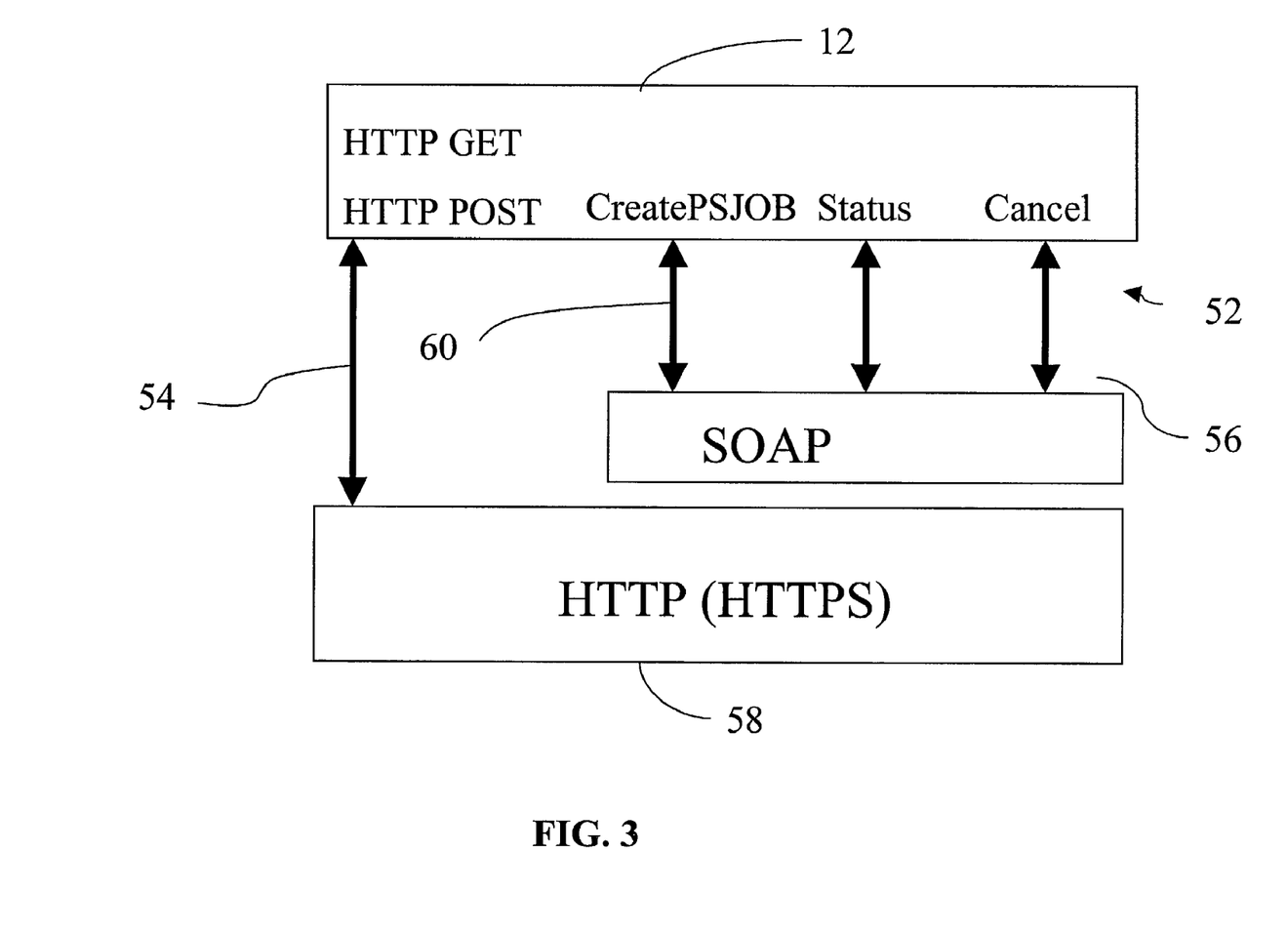
FIG. 3 illustrates a preferred print service interface.

At the time of accepting a reference 20, the print service 12 or 14 also may initiate a control communication 50 with the print device 10. As seen in FIG. 3, a control channel 52 and data channel 54 may be separate. In FIG. 3, the control communication is preferably conducted via an argument resolution protocol 56 namely, the SOAP protocol (Simple Object Access Protocol). The preferred data channel 54 uses an HTTP protocol. The control channel 52 is convenient for passing arguments and responses. Such a need for responses can occur when accessing the location including the print content, e.g., the content provider 18. Print service communications are layered on top of HTTP (HTTPS when secure access is used). HTTP is preferred because it provides an efficient and ubiquitous transport mechanism.

SOAP is preferably used to define three actions that are exported by the print service, job create, status check and job cancel. These actions along with generic HTTP access (HTTP GET and POST) support the requirements for the remote print service 12. A client initiates a print job using CreatePSJob 60. This action provides the print service 12 with information required to create a print job and to begin the processing of a print operation.

In a preferred protocol, the print service 12 creates a unique Job Identifier (JobID) that can be used in subsequent operations to identify the print Job. CreatePSJob supports both print by reference and information upload as a means of providing content to the print service 12. If the client is printing a reference then this is sent the Reference argument of action. If the client plans to upload information to the print service it does not specify a reference argument in the action request. When the client indicates that it wants to upload the information to be printed the client can include a DataSink URL in the CreatePSJob response. The client must then send the information to the print service 12 using a separate HTTP POST operation to the DataSink URL. The print service 12 also returns the JobID and a PrintSrc URL to client. The PrintSrc URL is used to retrieve the print ready information once the print service 12 has transcoded.

The reference, e.g., web site, might issue a security challenge as the print service 12 or 14 attempts to obtain the print data. In that case, the print service 12 or 14 accepts a security challenge 44 (FIG. 2) from the print data content location, e.g., content provider 18. The SOAP protocol 56 can be conveniently used to conduct a security communication 62 (FIG. 2). This communication 62 might pass on the security challenge to the print service 12 or 14 obtain information necessary for response, if the information was not initially provided to the print service 12. When the print service 12 or 14 has information necessary to respond, it then may respond to the security challenge.

The print service 12 or 14 may respond to the security challenge in a number of preferred ways. Access credentials may be included in the reference to content that is provided to the print service, and are thus received at the time that the print service accepts a reference in step 32. If not initially provided when the print service accepts a reference, the print service may pass the challenge back to the client who then may re-submit the request with the correct security information included. Another option is for the print service to support privacy through the encryption of the information exchanged between the print service and client, e.g. between print service 12 and the print device 10. This encryption can be imposed at the link level, e.g., HTTPS or IPSec, at the time of connection set-up. Since this level of security occurs at the link level it has no affect on the method of print by reference communications between the print service 12 and client, i.e., the print device 10 or the portable wireless device 16. Another approach is to have the information encrypted above the link level. An encryption/decryption and/or identification key can be used in print by reference communications with the print service.

The control channel also may be used to conduct job control. Job control allows the print service 12 to manage individual print by reference jobs, and allows handling of multiple jobs from separate clients. Multiple job handling is important if the print service 12 is to serve independent business services. For example, a print service web site hosting a print service of the invention for print by reference operations might be a paid service. Such a print service web site might alternatively be a supplement to some other commercial transaction. Thus, a purchaser of a print device 10 or a portable wireless device 16, or a purchaser of web services or wireless airtime might obtain access to a print by reference print service web site that implements the invention.

Figure 4:
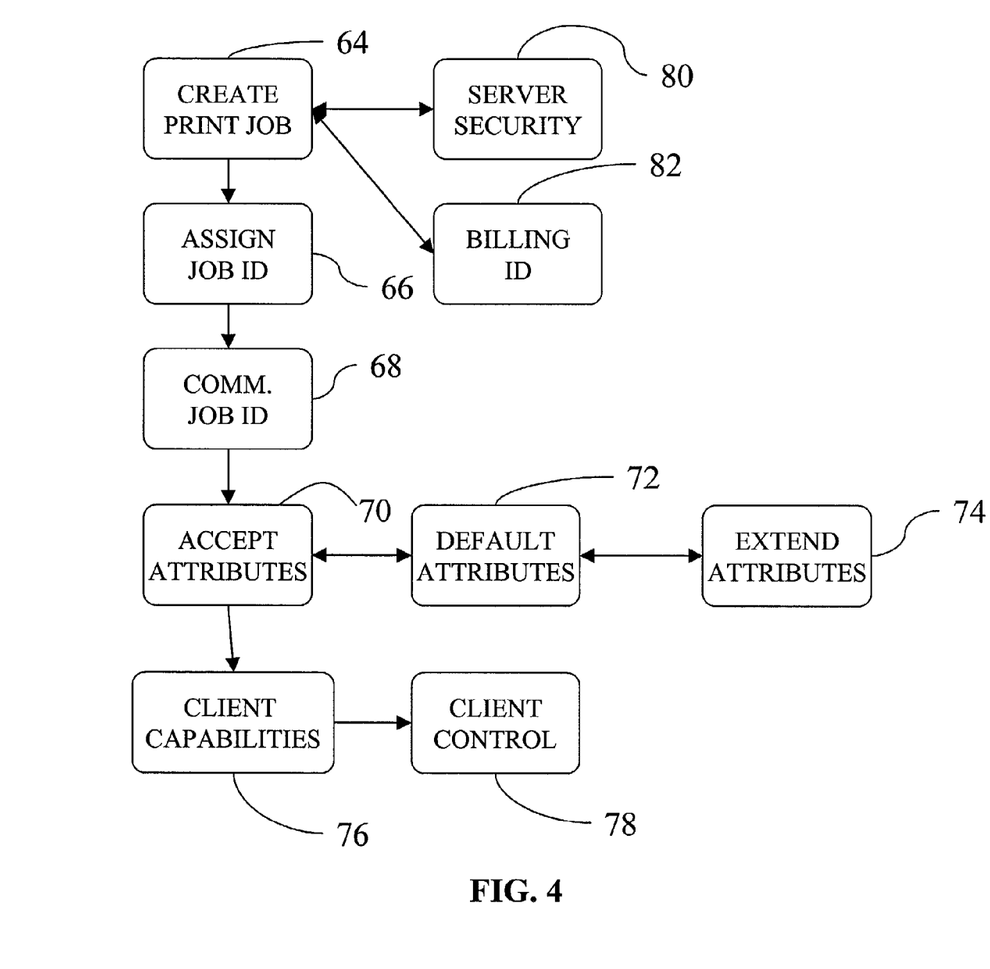
FIG. 4 illustrates a preferred method of job control for a print service method of the invention.

Job control is especially important for the remote print service 12, as it is likely to handle multiple jobs and deal with diverse print devices and portable wireless devices as different clients. FIG. 4 generally illustrates a preferred job control communication. Preferably, when the print service accepts a print by reference request, a print job is created 64 and a job identifier is assigned 66 to the print job. The job identifier is communicated to the print device 68, or alternatively a portable communication device if the portable communication device is communicating with the print service. Subsequent print control operations through the control channel 32 are conducted using the assigned job identifier to link operations to a particular print job. The print service 12 can preferably support a reflected user interface (RUI). The RUI is a web page used to control the print job using a web form that is reflected back to the user of the portable wireless device 16. The user would then be able to select options or fills out the form to provide job control parameters. The job identifier enables, for example, the print service to include the job identifier as a state variable that the print device 10 or the portable wireless device 16 returns as a result of selecting a hyper link included in the RUI web markup.

It is preferable for the print service 12 or 14 to permit a client print device or portable wireless device to set attributes. Thus, the print service 12 or 14 should accept print attributes 70. The attributes may determine the outcome of the print operation. The print service should also provide for default attributes 72 in the event that some or all attributes are not provided by a print service client, i.e., the print service 12 or 14 supports a standard set of print options. Extensions to the standard set of print options should be supported 74 to allow for evolution and support of differentiated vertical markets. Supporting extensions allows for updating of the print service 12 or 14 to account, for example, for new print formats and new print devices.

The print service 12 or 14 also should obtain some understanding of the client's capabilities 76. The step of transcoding 46 translates the print data into a print device ready format, thus requiring some knowledge of the capabilities of a particular print device client and its configuration in order to provide print ready information. A client, i.e., a print device or portable wireless device, should also be provided with some forms of job control 78. Examples are the ability to query the status 80 (see FIG. 3) of a print job or to cancel a print job 82 (see FIG. 3).

Security of the remote print service 12 can be a separate issue from the security of the content provider 18. A remote print service may need to protect itself from unauthorized use. To support this need the print service can provide a separate security check 80 for the print service to discover the identity of the client device to enforce access control. The server security check 80 is preferably conducted at the time that a print job is created 64. One option for the security check 58 is to require the client to provide credentials 60 in order to access the print service 12. The security check can be similar to the manner for checking security in response to a challenge by the content provider 18. Billing may be addressed with the security check for the print service, as the print service 12 or 14 may require billing ID 82 for use by a client. The print service 12 or 14 could use any standard or widely used billing models for a financial clearance conducted as part of a security communication 62.

In the case of the remote print service 12 accessed via the Internet, the transcoded data transfer to the print device 10 is preferably conducted with the print service setting up a Universal Resource Locator address for the transcoded data and then communicating the Universal Resource Locator address for the print data to the device. The protocol and operational structure of the interface to the remote print service 12 also forms an aspect of the invention. In general, the interface formed by the protocol carried out by the remote print service should provide for access by many clients. The interface must carry out a basic level of reference resolution and should provide enhanced print by reference features for clients capable of taking full advantage of the print service through use of a protocol of the invention.

The general structure of the preferred interface is shown in FIG. 3. Aspects of the preferred protocol executed by the interface will now be discussed. The primary use of the print service 12 and the interface thereto is the print by reference model where a print service client sends a reference to the print service. The print service 12 may optionally support other types of uses, e.g., a use model where content is uploaded from the print service client. The operations for the latter use may be identical after the print content is obtained from the client, whereas the former case requires the print service to obtain the reference content. This more complete use of the protocol is described to illustrate the protocol and interface.

The following table shows an example of an interaction between a print service client (Printer, portable device, e-service) and a Print Service.

| Client | | Print Service |
|---|---|---|
| Client starts Print job by sending a CreatePSJob action. | CreatePSJob → | |
| | ←CreatePSJob Response | Print Service receives request. Determines it is a Print by reference Job (because a Reference argument exists). The Print Service allocates a JobID and creates a PrintSrc URL. Sends a response to the client and starts to process the request. Printer information is obtained from the PrinterID specified. |
| Client tries to access the print data using a HTTP Get on the PrintSrc url Client waits before re-trying the request a second time Client processes information | | |
| | | Print Service will cache the Job information including the Printable data for a time period determined by the Print Service implementation before deletion. |

The interaction shown above described the printing of a reference. The reference was included in the initial CreatePSJob request. In this example CreatePSJob was the only SOAP action used. The next example will demonstrate content upload and the use of the Status action.

As seen from the above table, CreatePSJob is initiated by a client identifying a web site for the print service that is being interfaced, e.g., www.printersxxx.com. A SOAP action then follows in the preferred embodiment. SOAP connection being established though the conventional SOAP protocol completes a client/host connection, and the reference for a print by reference operation may then be passed from the client to the host print service. In the preferred embodiment, the required reference targeting print content to be printed is an XML reference including, for example: a name for the content (PrintName), the URL address for the content, a number of copies to be printed, an identification of the type of printer to print the content, security codes for accessing the content, billing codes, etc.

Uploading content from the client accessing the print service follows a similar sequence in the preferred embodiment. The following table shows a printing example utilizing a content upload from the client to the print service 12, and also illustrates some preferred operations for job control, i.e., the previously mentioned print status request and print job cancel.

| Client | Print Service | |
|---|---|---|
| Client starts Print job by sending a CreatePSJob action. | CreatePSJob → | |
| | ←CreatePSJob Response | Print Service receives request. Determines that the client needs to upload the content. The Print Service allocates a JobID and creates a PrintSrc URL and a DataSink URL. Sends a response to the client and waits for the client to send the data. Printer information is obtained from the PrinterID specified. |
| Client sends the Data to the print service using a HTTP POST to the DataSink URL | | |
| | | Print Service accepts the content and starts to process the information |
| Client Sends a Status action to learn the progress of the operation | | |
| | | Printer has completed processing and sends an Appropriate Response to the Status action |
| Client uses a HTTP GET to the PrintURL to obtain the Print data | | |
| | | Print Service has completed processing the reference and responds to the GET request with the data |
| Client processes information | | |
| | | Print Service will cache the Job information including the Printable data for a time period determined by the Print Service implementation before deletion. |

The example above shows the use of content upload and the status request action. The status request action can be used to provide more detailed feedback on the progress of a print service operation, preferably through the argument resolution protocol, e.g., SOAP, separate from the channel, e.g. HTTP, on which print content is passed. The argument resolution protocol also preferably supports a cancellation of a print job by the client. The following example shows the use of the cancel action to stop print operations

| Client | Print Service | |
|---|---|---|
| Client starts Print job by sending a CreatePSJob action. | CreatePSJob → | |
| | ←CreatePSJob Response | Print Service receives request. Determines it is a Print by reference Job (because a Reference argument exists). The Print Service allocates a JobID and creates a PrintSrc URL. Sends a response to the client and starts to process the request. Printer information is obtained from the PrinterID specified. |
| Client cancels the Print Job using the Cancel action | | |
| | | Printer receives cancel and stops processing the Job. The printer reclaims all resources associated with the Job. Sends a Response back to the client. |

While a specific embodiment of the present invention has been shown and others described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A communication protocol for use in communication between a client portable wireless device and a web based or local print service for a print by reference operation to deliver referenced content from a referenced location of a content provider that is separate from the print service to a print device, the protocol comprising a sequence of communications between the print service and the client including:
   a job request from the client to the print service;
   a job response from the print service to the client; and
   a reference to print content of the content provider identifying a location of the print content, the reference being passed from the client to the print service,
   wherein communications between the print service and the client are established with a Simple Object Access Protocol control channel.

2. The protocol according to claim 1, wherein said reference is included as part of said job request.

3. The protocol according to claim 1, wherein said reference comprises a universal resource locator address that addresses print content targeted for printing.

4. The protocol according to claim 3, wherein said reference comprises a reference list of individual references that each reference print content stored at a location.

5. The protocol according to claim 4, wherein said reference includes a name for the print content.

6. The protocol according to claim 1, wherein said job request includes security data for accessing the print content.

7. The protocol according to claim 1, wherein said job response includes a universal resource locator address for the print data which the client will use to download print content from the print service.

8. The protocol according to claim 1, wherein said job response includes a JobID.

9. The protocol according to claim 1, wherein said job request includes a billing ID from the print client.

10. The protocol according to claim 1, comprising separate control and data operations.

11. The protocol according to claim 10, wherein the control operations include a print status request from the client and a print status response from the print service.

12. The protocol according to claim 10, wherein the control operations include a print cancel from the client to the print service.

13. The print service according to claim 10, wherein said data operations include an HTTP GET for the client to obtain print content from the print service.

14. The print service according to claim 10, wherein said data operations include an HTTP POST for the client to send print content to the print service.

15. The protocol according to claim 1, wherein data exchange between the print service and the client is established with an HTTP data channel.

16. The protocol according to claim 15, wherein the client and the print service use the Simple Object Access Protocol control channel to establish and maintain control communications for the print by reference operation, and use the HTTP data channel to transfer the print content from the print service to the client.

17. A communication protocol for use in communication between a client and a print service for a print by reference operation to deliver referenced content from a referenced location to a print device, the protocol comprising a sequence of communications between the print service and the client including:

a job request from the client to the print service;

a job response from the print service to the client; and a reference to print content identifying a location including print content, the reference being passed from the client to the print service, wherein the job request is initiated via a control channel, wherein the control channel is established via an argument resolution protocol, wherein the argument resolution protocol is the Simple Object Access Protocol and wherein the reference is passed via a data channel.

18. The protocol according to claim 17, wherein the data channel is an HTTP channel.

19. A communication protocol interface for use in communication between a client and a print service for a print by reference operation to deliver referenced content from a referenced location to a print device, the interface including:

a SOAP control channel for establishment of communications between the print service and the client;

an HTTP data channel for data exchange between the print service and the client;

wherein the client and the print service use the SOAP control channel to establish and maintain control communications for a print by reference operation, and use the data channel to transfer the print content from the print service to the client.

\* \* \* \* \*